United States Patent Office 2,726,962
Patented Dec. 13, 1955

2,726,962
DEFOGGING COMPOUND
Gabriella A. Iorio, Philadelphia, Pa.

No Drawing. Application July 3, 1953,
Serial No. 366,078

6 Claims. (Cl. 106—13)

(Granted under Title 35, U. S. Code (1952), sec. 266)

The invention described herein may be manufactured by or for the Government of the United States of America for governmental purposes without the payment of any royalties thereon or therefor.

The present invention relates to a novel and improved defogging composition or the like and more particularly to a unique composition which is adapted to be applied in the form of a thin film upon a transparent polished surface or the like to retard and prevent the accumulation of condensed moisture or fog thereon.

In the field of aeronautics the pilots of both military and commercial aircraft require full unrestricted visibility in order to properly and safely navigate and/or control their aircraft at all times. It is, therefore, important to minimize and/or eliminate the accumulation of water droplets or fog which invariably collects upon the various transparent enclosures of the aircraft particularly when relatively sudden variations in atmospheric pressures and temperatures occur during rapid changes in elevation of the aircraft.

Various types of forced heated air systems and the like have been devised and employed in the past to retard the said fogging phenomenon. However, inasmuch as such systems have been found effective merely in removing the fog once it has been formed, these systems have in general been considered unsatisfactory since even the inherent momentary obstruction of the pilot's vision produces a hazard to the safe operation of the aircraft.

In view of the shortcomings and the unsatisfactory results which have been obtained from the above mentioned heated air systems and the like, the development of a suitable composition which, when applied in the form of a thin film to the transparent surface will reduce the surface tension of the moisture that condenses thereon and thereby prevent the formation of droplets or fog, has in the past been the objective of an intensive search. Although as a result of this search a number of so-called defogging compounds have already been suggested and marketed, considerable difficulty has been experienced heretofore in obtaining such a compound which is sufficiently effective and efficient in use and yet not harmful to the plastic or glass transparent surface to which it is applied.

It is a principal object of the present invention to provide a novel and improved defogging composition which is suitable for application to a transparent surface or the like and to thereby prevent and/or retard the accumulation of moisture condensation thereon from the surrounding atmosphere.

It is a further object of the present invention to provide a novel and improved defogging composition which has no adverse effect on the material out of which the preselected transparent enclosure or the like is formed and/or constructed.

It is a still further object of the present invention to provide a unique defogging composition which has a relatively high flashing point and which is easy and inexpensive to prepare and/or manufacture.

Other objects and many of the attendant advantages of the invention will be readily apparent as the same becomes better understood by reference to the following detailed description.

In general all of the above objects of the present invention are accomplished by the use of a first ingredient which acts as a wetting agent as well as an effective absorbent and as such thereby substantially reduces the surface tension of the moisture that condenses on the transparent surface and prevents the formation of water droplets or fog thereon, a second ingredient which acts as an emulsifying agent to allow the wetting agent to become miscible in the solvent so as to prevent the wetting agent from being readily washed away and to thereby prolong the effectiveness of the composition, and a solvent for the said first and second ingredients which solvent facilitates the application of the composition in the form of a thin film upon the transparent surface.

A preferred embodiment or example of the specific materials which illustrates the invention and the preferred proportions by weight in the improved defogging composition are as follows:

| | Parts |
|---|---|
| Polyoxyethylene sorbitan monostearate ("Tween 61") | 8.5 |
| Polyoxyethylene sorbitan monooleate ("Tween 80") | 21.6 |
| Mineral spirits | 54.7 |

In this mixture the polyoxyethylene sorbitan monooleate serves as an effective wetting agent as well as an efficient moisture absorbent and thereby causes the aqueous condensation from the surrounding atmosphere to spread readily over the entire transparent surface. In this way an accumulation of water droplets or fog on the preselected transparent surface is retarded and/or prevented. Inasmuch as the polyoxyethylene sorbitan monooleate is relatively soluble in water the polyoxyethylene sorbitan monostearate which acts as an emulsifying agent and which is relatively insoluble in water acts to prevent the polyoxyethylene sorbitan monooleate from being quickly washed away. In this way the effective persistance of the defogging composition is substantially and materially prolonged. The mineral spirits which is obtained during the distillation of petroleum between 149° C.+204° C. and which also form an important ingredient of the composition acts as a suitable solvent for the above mentioned other ingredients and thereby permits an easy application of the composition to the preselected transparent surface without crazing or otherwise damaging the plastic material or the like out of which the preselected transparent surface is often formed. It might also be noted that, although other solvents such as aliphatic naphtha or the like which is obtained during the distillation of petroleum between 85° C. and 143° C. could also be used without departing from the spirit or scope of the present invention, the mineral spirits have been found particularly satisfactory in view of its relatively high flashing point characteristic.

In compounding the above mentioned ingredients of the improved mixture of the present invention the polyoxyethylene sorbitan monostearate which ordinarily exists in a solid state at normal temperatures and pressures is preferably first melted at approximately 101° F. This melt is then mixed with and/or dissolved in the mineral spirits by suitable agitation or the like and the polyoxyethylene sorbitan monooleate is added to the solution. This composition is then applied to the preselected transparent surface in any conventional manner such as by way of a suitable cloth or the like.

It is to be understood that suitable variations from the above described specific proportions could be made without departing from the spirit or scope of the present invention but that best results have been obtained within a variation of ten percent from the amounts specified.

In addition to the above described preferred embodiment of the invention, other suitable examples which also illustrate the invention were prepared in the following manner:

*Example 1*

25 parts by weight of polyoxyethylene sorbitan monolaurate ("Tween 21") which is an oily liquid at normal values of temperature and pressure was mixed with and/or dissolved in 55 parts by weight of mineral spirits. 10 parts by weight of polyoxyethylene sorbitan monostearate ("Tween 61") was then added and the resultant composition was applied by means of a suitable cloth or the like to the preselected transparent surface.

*Example 2*

8 parts by weight of polyoxyethylene sorbitan monostearate ("Tween 61") which exists in a solid state under normal conditions of temperature and pressure was first melted at approximately 101° F. This melt was then mixed with and/or dissolved in 50 parts by weight of aliphatic naphtha and 20 parts by weight of polyoxyethylene sorbitan monooleate ("Tween 80") and 4 parts by weight of "Triton" which is an alkyl aryl polyether alcohol and which acted as a detergent was added to the solution. The resultant composition was then applied to the preselected transparent surface by means of a suitable cloth.

*Example 3*

10 parts by weight of polyoxyethylene sorbitol pentooleate "G2855" was mixed with an dissolved in 50 parts by weight of mineral spirts. 20 parts by weight of polyoxyethylene sorbitan monooleate "Tween 80" was added to the above ingredients and the resultant composition was applied to the preselected surface by means of a cloth.

Although the above described defogging compositions have been found particularly useful when applied to the transparent windshields and other similar enclosures of various types of aircraft and the like, it is to be understood that the same could be used to prevent the accumulation of moisture condensation on any other suitable surface without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. A composition of matter for preventing the accumulation of moisture on a preselected surface comprising 10 to 30 parts by weight one of a group of wetting agents consisting of polyoxyethylene sorbitan monooleate, and polyoxyethylene sorbitan monolaurate, 5 to 15 parts by weight one of a group of emulsifying agents consisting of polyoxyethylene sorbitan monostearate, and polyoxyethylene sorbital pentooleate; and one of a group of organic solvents consisting of aliphatic naphtha and mineral spirits.

2. A composition of matter for preventing the accumulation of moisture on a preselected surface comprising 10 to 30 parts by weight one of a group of wetting agents consisting of polyoxyethylene sorbitan monooleate, and polyoxyethylene sorbitan monolaurate, 5 to 15 parts by weight one of a group of emulsifying agents consisting of polyoxyethylene sorbitan monostearate, and polyoxyethylene sorbitol pentooleate; .3 to 1.5 parts by weight of an alkyl aryl polyether alcohol; and 50 to 80 parts by weight one of a group of organic solvents consisting of aliphatic naphtha and mineral spirits.

3. A composition of matter for preventing the accumulation of moisture on a preselected surface comprising 10 to 30 parts by weight of polyoxyethylene sorbitan monooleate; 5 to 15 parts by weight of polyoxyethylene sorbitan monostearate, and 50 to 80 parts by weight of mineral spirits.

4. A composition of matter for preventing the accumulation of moisture on a preselected surface comprising 10 to 30 parts by weight of polyoxyethylene sorbitan monolaurate; 5 to 15 parts by weight of polyoxyethylene sorbitan monostearate; and 50 to 80 parts by weight of mineral spirits.

5. A composition of matter for preventing the accumulation of moisture on a preselected surface comprising 10–30 parts by weight of polyoxyethylene sorbitan monooleate; 5 to 15 parts by weight of polyoxyethylene sorbitan monostearate; 50 to 80 parts by weight of aliphatic naphtha; and .3 to 1.5 parts by weight of alkyl aryl polyether alcohol "Triton."

6. A composition of matter for preventing the accumulation of moisture on a preselected surface comprising 25 parts by weight of polyoxyethylene sorbitan monooleate; 10 parts by weight of polyoxyethylene sorbital pentooleate; and 55 parts by weight of mineral spirits.

References Cited in the file of this patent

UNITED STATES PATENTS

| | | |
|---|---|---|
| 2,372,171 | Bennett | Mar. 27, 1945 |
| 2,451,814 | Dissel et al. | Oct. 19, 1948 |
| 2,561,010 | Carson | July 17, 1951 |

OTHER REFERENCES

Atlas: "Surface Active Agents" (1948).